US011400380B2

(12) United States Patent
Takahashi et al.

(10) Patent No.: US 11,400,380 B2
(45) Date of Patent: Aug. 2, 2022

(54) INFORMATION PROCESSING APPARATUS AND DOWNLOAD PROCESSING METHOD

(71) Applicant: Sony Interactive Entertainment Inc., Tokyo (JP)

(72) Inventors: Masaki Takahashi, Kanagawa (JP); Syunsuke Bamba, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 202 days.

(21) Appl. No.: 16/621,875

(22) PCT Filed: Jul. 24, 2018

(86) PCT No.: PCT/JP2018/027685
§ 371 (c)(1),
(2) Date: Dec. 12, 2019

(87) PCT Pub. No.: WO2019/026687
PCT Pub. Date: Feb. 7, 2019

(65) Prior Publication Data
US 2020/0222812 A1 Jul. 16, 2020

(30) Foreign Application Priority Data
Jul. 31, 2017 (JP) .............................. JP2017-148128

(51) Int. Cl.
*A63F 13/77* (2014.01)
*G06F 8/61* (2018.01)

(52) U.S. Cl.
CPC ................ *A63F 13/77* (2014.09); *G06F 8/64* (2013.01); *A63F 2300/552* (2013.01)

(58) Field of Classification Search
CPC ....... A63F 13/77; A63F 2300/552; G06F 8/64
See application file for complete search history.

(56) References Cited

U.S. PATENT DOCUMENTS 5,307,494 A * 4/1994 Yasumatsu .......... G06F 16/9014
5,771,064 A * 6/1998 Lett ...................... H04N 21/435
725/132
(Continued)

FOREIGN PATENT DOCUMENTS

| WO | 2005083575 A1 | 9/2005 |
| WO | 2008149501 A1 | 12/2008 |
| WO | 2014111984 A1 | 7/2014 |

OTHER PUBLICATIONS

International Search Report for corresponding PCT Application No. PCT/JP2018/027685, 3 pages, dated Aug. 21, 2018.
(Continued)

*Primary Examiner* — David L Lewis
*Assistant Examiner* — Matthew D Hoel
(74) *Attorney, Agent, or Firm* — Matthew B. Dernier, Esq.

(57) ABSTRACT

A language information retention section retains working language information for specifying a user-selected working language in an information processing apparatus. A download processing section downloads application software into an auxiliary storage apparatus. The download processing section acquires a data region in the auxiliary storage apparatus as needed for an application body and language-dependent files for a working language before the start of an application software download, and then executes the application software download. In a case where the working language used by an application is changed, the download processing section confirms whether or not a data region for language-dependent files for the changed working language can be acquired in the auxiliary storage apparatus 2.

12 Claims, 8 Drawing Sheets

(56) References Cited

U.S. PATENT DOCUMENTS

| | | | | |
|---|---|---|---|---|
| 5,850,266 A * | 12/1998 | Gimby | G09G 5/36 | 348/558 |
| 5,917,912 A * | 6/1999 | Ginter | H04N 21/235 | 705/40 |
| 5,951,639 A * | 9/1999 | MacInnis | H04N 7/17354 | 348/E7.063 |
| 6,021,491 A * | 2/2000 | Renaud | G06F 21/64 | 713/180 |
| 6,118,924 A * | 9/2000 | Nakatani | G11B 20/10527 | 386/248 |
| 6,285,827 B1 * | 9/2001 | Nakatani | G11B 20/10527 | 386/334 |
| 6,345,028 B1 * | 2/2002 | Jaeger | G11B 3/64 | 369/124.08 |
| 6,353,704 B1 * | 3/2002 | Nakatani | G11B 27/329 | 386/334 |
| 6,370,325 B2 * | 4/2002 | Nakatani | G11B 20/10527 | 386/216 |
| 6,397,381 B1 * | 5/2002 | Delo | G06F 8/61 | 717/174 |
| 6,453,470 B1 * | 9/2002 | Gazda | G06F 8/61 | 717/174 |
| 6,487,723 B1 * | 11/2002 | MacInnis | G06F 8/64 | 725/132 |
| 6,645,077 B2 * | 11/2003 | Rowe | A63F 13/77 | 463/43 |
| 6,647,442 B1 * | 11/2003 | Shimada | G01B 11/2545 | 710/52 |
| 6,675,382 B1 * | 1/2004 | Foster | G06F 21/14 | 717/172 |
| 6,718,374 B1 * | 4/2004 | Del Sordo | H04N 21/8166 | 348/E7.063 |
| 6,792,245 B1 * | 9/2004 | Kawai | A63F 13/71 | 455/66.1 |
| 6,805,634 B1 * | 10/2004 | Wells | A63F 13/12 | 463/43 |
| 6,931,198 B1 * | 8/2005 | Hamada | H04N 21/44209 | 386/234 |
| 7,069,578 B1 * | 6/2006 | Prus | H04N 21/4383 | 725/132 |
| 7,103,262 B2 * | 9/2006 | Nakatani | G11B 20/10527 | 386/241 |
| 7,124,289 B1 * | 10/2006 | Suorsa | G06F 8/61 | 713/1 |
| 7,149,156 B2 * | 12/2006 | Fujisawa | G11B 27/002 | 369/30.05 |
| 7,186,181 B2 * | 3/2007 | Rowe | G07F 17/32 | 463/42 |
| 7,275,243 B2 * | 9/2007 | Gibbons | H04L 67/04 | 707/E17.116 |
| 7,290,013 B2 * | 10/2007 | Doucette | G06F 3/0605 | 707/823 |
| 7,320,087 B2 * | 1/2008 | Sato | G06F 11/1433 | 714/6.1 |
| 7,472,140 B2 * | 12/2008 | Agarwal | G06F 16/322 | 707/999.203 |
| 7,478,361 B2 * | 1/2009 | Peteanu | G06F 8/61 | 717/102 |
| 7,486,294 B2 * | 2/2009 | Beda | G06T 11/20 | 345/581 |
| 7,523,411 B2 * | 4/2009 | Carlin | G06Q 30/02 | 715/764 |
| 7,536,420 B2 * | 5/2009 | Takashima | G11B 20/00086 | |
| 7,565,062 B2 * | 7/2009 | Iwamoto | G11B 27/105 | 386/240 |
| 7,599,877 B1 * | 10/2009 | Cole | G06Q 40/04 | 705/37 |
| 7,613,862 B2 * | 11/2009 | Mihai | G06F 9/4415 | 719/321 |
| 7,616,864 B2 * | 11/2009 | Tanaka | G11B 27/105 | 386/239 |
| 7,639,923 B2 * | 12/2009 | Ikeda | G11B 20/00159 | 386/291 |
| 7,660,837 B2 * | 2/2010 | Rajakarunanayake | G06F 3/0644 | 707/999.205 |
| 7,676,513 B2 * | 3/2010 | McSherry | G06F 16/20 | 707/751 |
| 7,701,811 B2 * | 4/2010 | Fujisawa | G11B 27/3063 | 369/30.05 |
| 7,774,820 B2 * | 8/2010 | Prus | H04N 21/8402 | 717/172 |
| 7,782,719 B2 * | 8/2010 | Fujisawa | G06F 16/00 | 369/30.05 |
| 7,785,204 B2 * | 8/2010 | Wells | G07F 17/323 | 717/172 |
| 7,827,588 B2 * | 11/2010 | Mukaide | H04N 21/422 | 725/141 |
| 7,840,115 B2 * | 11/2010 | Nakatani | G11B 20/10527 | 386/352 |
| 7,845,000 B2 * | 11/2010 | Viger | H04L 67/02 | 726/3 |
| 7,860,821 B2 * | 12/2010 | Takakura | H04N 1/00411 | 707/600 |
| 7,951,006 B2 * | 5/2011 | Wells | G06F 21/51 | 463/43 |
| 7,993,194 B1 * | 8/2011 | Bond | G07F 17/3232 | 463/20 |
| 8,036,513 B2 * | 10/2011 | Oashi | G11B 20/00086 | 386/240 |
| 8,051,031 B2 * | 11/2011 | Sims, III | G06F 8/64 | 707/602 |
| 8,055,393 B2 * | 11/2011 | Sims, III | G06F 8/64 | 701/3 |
| 8,132,176 B2 * | 3/2012 | Bissett | G06F 16/10 | 718/1 |
| 8,171,512 B2 * | 5/2012 | Song | H04N 21/435 | 725/139 |
| 8,185,872 B2 * | 5/2012 | Harmsen | G06F 8/60 | 717/121 |
| 8,213,781 B2 * | 7/2012 | Fujinami | G11B 27/329 | 386/355 |
| 8,226,470 B2 * | 7/2012 | Bond | G07F 17/3232 | 463/16 |
| 8,230,482 B2 * | 7/2012 | Peterson | H04L 9/3231 | 726/19 |
| 8,267,793 B2 * | 9/2012 | Engolz | A63F 13/50 | 463/40 |
| 8,285,115 B2 * | 10/2012 | Ohizumi | H04N 21/485 | 386/248 |
| 8,298,085 B2 * | 10/2012 | Bond | G06F 9/4411 | 463/16 |
| 8,370,330 B2 * | 2/2013 | Priyadarshan | G06F 16/285 | 707/723 |
| 8,396,759 B2 * | 3/2013 | Mehta | G06Q 30/0282 | 705/26.7 |
| 8,416,345 B2 * | 4/2013 | Tsai | H04N 21/4884 | 348/468 |
| 8,484,634 B2 * | 7/2013 | Ridley | G06F 8/61 | 717/121 |
| 8,540,576 B2 * | 9/2013 | Rowe | G07F 17/32 | 463/42 |
| 8,545,334 B2 * | 10/2013 | Bond | G07F 17/32 | 463/16 |
| 8,559,789 B2 | 10/2013 | Tanaka | | |
| 8,572,580 B2 * | 10/2013 | Sheehan | G06F 9/44536 | 717/124 |
| 8,582,958 B2 * | 11/2013 | Matsuura | H04N 5/85 | 386/326 |
| 8,649,981 B2 * | 2/2014 | Sipe | G06T 7/0012 | 382/128 |
| 8,758,143 B2 * | 6/2014 | Bond | G06F 8/65 | 463/16 |
| 8,839,234 B1 * | 9/2014 | Voronkov | G06F 9/4451 | 717/172 |
| 8,885,633 B2 | 11/2014 | Murai | | |

(56) References Cited

U.S. PATENT DOCUMENTS

| | | | |
|---|---|---|---|
| 8,990,924 B2* | 3/2015 | Chow | A61N 1/37264 |
| | | | 726/17 |
| 9,043,919 B2* | 5/2015 | Wyatt | G06F 21/562 |
| | | | 707/708 |
| 9,189,220 B2* | 11/2015 | Gill | G06F 9/445 |
| 9,323,514 B2* | 4/2016 | Constable | G06F 8/61 |
| 9,392,047 B1* | 7/2016 | Santana | H04L 67/34 |
| 9,517,410 B2* | 12/2016 | Ahiska | G06F 9/44568 |
| 9,529,725 B2 | 12/2016 | Hashimoto | |
| 9,631,131 B2* | 4/2017 | Witham | C08G 73/0293 |
| 9,661,259 B2* | 5/2017 | Esumi | G06F 3/06 |
| 9,675,890 B2* | 6/2017 | Ahiska | H04L 67/2852 |
| 9,747,084 B2* | 8/2017 | Hall | G06F 8/71 |
| 9,747,431 B2* | 8/2017 | Chow | A61N 1/37254 |
| 9,766,870 B2* | 9/2017 | Salameh | G06F 8/61 |
| 9,792,778 B2* | 10/2017 | Irby, II | G07F 17/3223 |
| 9,812,194 B1* | 11/2017 | Lin | G11C 16/3418 |
| 9,881,321 B2* | 1/2018 | Peng | G06Q 30/0276 |
| 9,967,228 B2* | 5/2018 | Logue | H04L 67/06 |
| 9,992,158 B2* | 6/2018 | Erickson | H04L 61/4511 |
| 10,015,282 B2* | 7/2018 | Boyd | G06F 8/64 |
| 10,084,745 B2* | 9/2018 | Smith | H04L 12/283 |
| 10,228,933 B2* | 3/2019 | Fortune | G06F 9/44536 |
| 10,360,017 B1* | 7/2019 | Salameh | G06F 8/30 |
| 10,440,068 B2* | 10/2019 | Logue | H04L 69/28 |
| 10,476,918 B2* | 11/2019 | Erickson | H04W 4/80 |
| 10,503,715 B1* | 12/2019 | Massaguer | G06F 16/313 |
| 10,748,185 B2* | 8/2020 | Peng | G06Q 30/0256 |
| 10,817,281 B2* | 10/2020 | Huang | G06F 16/957 |
| 10,826,947 B2* | 11/2020 | Smith | G05B 15/02 |
| 10,955,994 B2* | 3/2021 | Kondrk | G06Q 30/0641 |
| 11,042,364 B2* | 6/2021 | Storm | G06F 8/61 |
| 2001/0049648 A1* | 12/2001 | Naylor | G06Q 30/08 |
| | | | 705/37 |
| 2002/0013772 A1* | 1/2002 | Peinado | H04L 63/0823 |
| | | | 705/51 |
| 2002/0038451 A1* | 3/2002 | Tanner | G06F 9/451 |
| | | | 717/105 |
| 2002/0093538 A1* | 7/2002 | Carlin | G06Q 30/02 |
| | | | 715/778 |
| 2002/0165026 A1* | 11/2002 | Perkins | A63F 13/12 |
| | | | 463/43 |
| 2003/0028899 A1* | 2/2003 | MacInnis | H04N 21/4432 |
| | | | 725/132 |
| 2003/0037327 A1* | 2/2003 | Cicciarelli | G06F 8/61 |
| | | | 717/170 |
| 2003/0078960 A1* | 4/2003 | Murren | H04L 67/34 |
| | | | 709/203 |
| 2003/0200168 A1* | 10/2003 | Cullen, III | G06Q 30/04 |
| | | | 705/37 |
| 2003/0212990 A1* | 11/2003 | Brodkorb | G06F 8/61 |
| | | | 717/170 |
| 2004/0003390 A1* | 1/2004 | Canter | G06F 8/61 |
| | | | 717/173 |
| 2004/0010786 A1* | 1/2004 | Cool | G06F 8/65 |
| | | | 717/173 |
| 2004/0038740 A1* | 2/2004 | Muir | G07F 17/32 |
| | | | 463/40 |
| 2004/0060035 A1* | 3/2004 | Ustaris | G06F 8/71 |
| | | | 717/174 |
| 2004/0107291 A1* | 6/2004 | Gamo | G06F 9/445 |
| | | | 709/232 |
| 2004/0128382 A1* | 7/2004 | Shimoda | H04W 52/00 |
| | | | 709/225 |
| 2004/0183828 A1* | 9/2004 | Nichogi | G06F 3/14 |
| | | | 715/745 |
| 2004/0194059 A1* | 9/2004 | Akella | G06F 8/61 |
| | | | 717/118 |
| 2004/0210923 A1* | 10/2004 | Hudgeons | G09B 7/02 |
| | | | 725/24 |
| 2004/0250167 A1* | 12/2004 | Sato | G06F 11/1433 |
| | | | 714/6.1 |
| 2005/0085277 A1* | 4/2005 | Chen | G06F 1/3215 |
| | | | 455/572 |
| 2005/0149925 A1* | 7/2005 | Pichetti | G06F 8/658 |
| | | | 717/177 |
| 2005/0240392 A1* | 10/2005 | Munro, Jr. | G06F 16/90332 |
| | | | 707/E17.139 |
| 2005/0251682 A1* | 11/2005 | Collins | G06F 21/64 |
| | | | 713/176 |
| 2006/0098936 A1* | 5/2006 | Ikeda | H04N 9/8715 |
| | | | 386/201 |
| 2006/0136907 A1* | 6/2006 | Bennett | G06F 8/61 |
| | | | 717/174 |
| 2006/0179135 A1 | 8/2006 | Murai | |
| 2006/0212923 A1* | 9/2006 | Soneira | G09G 5/003 |
| | | | 348/E17.005 |
| 2006/0257114 A1* | 11/2006 | Nakatani | G11B 20/1252 |
| | | | 386/288 |
| 2006/0280455 A1* | 12/2006 | Ando | G11B 27/036 |
| | | | 386/248 |
| 2007/0041709 A1* | 2/2007 | Kim | G11B 27/3027 |
| | | | 386/243 |
| 2007/0041710 A1* | 2/2007 | Kim | H04N 9/8042 |
| | | | 386/243 |
| 2007/0041711 A1* | 2/2007 | Kim | G11B 27/10 |
| | | | 386/243 |
| 2007/0041712 A1* | 2/2007 | Kim | G11B 27/10 |
| | | | 386/244 |
| 2007/0041713 A1* | 2/2007 | Kim | G11B 27/105 |
| | | | 386/244 |
| 2007/0074031 A1* | 3/2007 | Adams | G06F 21/629 |
| | | | 713/176 |
| 2007/0078009 A1* | 4/2007 | Lockton | A63F 13/335 |
| | | | 463/43 |
| 2007/0086727 A1* | 4/2007 | Tanaka | H04N 9/87 |
| | | | 386/243 |
| 2007/0130073 A1* | 6/2007 | Celli | G06F 21/121 |
| | | | 705/51 |
| 2007/0136282 A1* | 6/2007 | Takashima | G11B 20/0021 |
| 2007/0168919 A1* | 7/2007 | Henseler | G06F 9/5027 |
| | | | 717/101 |
| 2007/0201655 A1* | 8/2007 | Shenfield | H04L 67/34 |
| | | | 379/201.01 |
| 2007/0223876 A1* | 9/2007 | Hashimoto | G11B 27/34 |
| | | | 386/241 |
| 2007/0250711 A1* | 10/2007 | Storey | H04W 12/06 |
| | | | 713/168 |
| 2007/0253679 A1* | 11/2007 | Tanaka | G11B 20/10 |
| | | | 386/248 |
| 2007/0255711 A1* | 11/2007 | Zhou | G06F 16/20 |
| 2007/0276767 A1* | 11/2007 | Kim | G06Q 20/085 |
| | | | 705/77 |
| 2007/0286575 A1* | 12/2007 | Oashi | G11B 20/00731 |
| | | | 386/230 |
| 2008/0031601 A1* | 2/2008 | Hashimoto | H04N 21/858 |
| | | | 386/336 |
| 2008/0075419 A1* | 3/2008 | Okubo | G11B 27/031 |
| | | | 386/332 |
| 2008/0127179 A1* | 5/2008 | Moss | G06F 8/61 |
| | | | 717/174 |
| 2008/0134012 A1* | 6/2008 | Kokes | H04L 65/70 |
| | | | 715/201 |
| 2008/0145031 A1* | 6/2008 | Tanaka | G11B 27/10 |
| | | | 386/335 |
| 2008/0201748 A1* | 8/2008 | Hasek | G06F 21/10 |
| | | | 725/111 |
| 2008/0285947 A1* | 11/2008 | Hashimoto | G11B 27/10 |
| | | | 386/248 |
| 2008/0301672 A1* | 12/2008 | Rao | G06F 8/61 |
| | | | 717/176 |
| 2009/0064055 A1* | 3/2009 | Chaudhri | G06F 3/04817 |
| | | | 715/863 |
| 2009/0083732 A1* | 3/2009 | Shen | G06F 8/20 |
| | | | 717/177 |
| 2009/0106748 A1* | 4/2009 | Chess | G06F 9/455 |
| | | | 717/168 |

(56) References Cited

U.S. PATENT DOCUMENTS

| | | | |
|---|---|---|---|
| 2009/0204825 A1* | 8/2009 | Takashima | G11B 20/00492 713/193 |
| 2009/0249326 A1* | 10/2009 | Ridley | G06F 8/61 717/174 |
| 2009/0271782 A1* | 10/2009 | Ciudad | G06F 8/60 717/176 |
| 2009/0284553 A1* | 11/2009 | Seydoux | A63F 13/803 345/660 |
| 2009/0300596 A1* | 12/2009 | Tyhurst | G06F 8/65 717/173 |
| 2009/0328028 A1* | 12/2009 | O'Rourke | G06F 8/65 717/173 |
| 2010/0009735 A1* | 1/2010 | Seydoux | A63H 30/04 463/31 |
| 2010/0014580 A1* | 1/2010 | Tanaka | H04N 9/87 375/240.01 |
| 2010/0034516 A1 | 2/2010 | Tanaka | |
| 2010/0037207 A1* | 2/2010 | Chambers, Jr. | G06F 8/63 717/121 |
| 2010/0046747 A1* | 2/2010 | Oashi | G11B 27/329 380/30 |
| 2010/0046923 A1* | 2/2010 | Ikeda | G11B 27/11 386/241 |
| 2010/0046924 A1* | 2/2010 | Ikeda | H04N 5/85 386/241 |
| 2010/0082974 A1* | 4/2010 | Sheth | G06F 21/6218 380/278 |
| 2010/0088466 A1* | 4/2010 | Nakanishi | G06F 3/0613 711/103 |
| 2010/0138930 A1* | 6/2010 | Little | H04L 9/00 707/813 |
| 2010/0142930 A1* | 6/2010 | Tanaka | G11B 27/105 386/334 |
| 2010/0241650 A1* | 9/2010 | Chittar | G06F 16/5854 707/769 |
| 2011/0026386 A1* | 2/2011 | Nakatani | G11B 27/329 369/47.49 |
| 2011/0032250 A1* | 2/2011 | Tanaka | A63F 13/12 345/418 |
| 2011/0047597 A1* | 2/2011 | Mahaffey | H04L 67/60 709/219 |
| 2011/0083069 A1* | 4/2011 | Paul | H04N 21/2393 715/234 |
| 2011/0170837 A1* | 7/2011 | Barnes, Jr. | G06Q 30/0643 386/239 |
| 2011/0196667 A1* | 8/2011 | Sasaki | G06F 40/126 704/8 |
| 2011/0276961 A1* | 11/2011 | Johansson | H04W 4/50 717/178 |
| 2012/0004040 A1* | 1/2012 | Pereira | A63F 13/355 463/42 |
| 2012/0110174 A1* | 5/2012 | Wootton | H04L 63/1416 709/224 |
| 2012/0159260 A1* | 6/2012 | Fortune | G06F 9/454 714/38.1 |
| 2012/0159470 A1* | 6/2012 | Yang | G06F 8/61 717/175 |
| 2012/0166513 A1* | 6/2012 | Fortune | G06F 16/13 709/201 |
| 2012/0167111 A1* | 6/2012 | Fortune | G06F 8/71 718/104 |
| 2012/0192171 A1* | 7/2012 | Tanaka | A63F 13/77 717/168 |
| 2012/0215562 A1* | 8/2012 | James | G16Z 99/00 705/3 |
| 2012/0216292 A1* | 8/2012 | Richardson | H04W 12/082 726/27 |
| 2012/0233239 A1* | 9/2012 | Urim | G06F 9/542 709/203 |
| 2012/0233564 A1* | 9/2012 | Tsuchiya | A63F 13/795 715/772 |
| 2012/0240236 A1* | 9/2012 | Wyatt | G06F 21/562 726/25 |
| 2012/0246482 A1* | 9/2012 | Sherkin | H04L 9/3236 713/176 |
| 2012/0309515 A1* | 12/2012 | Chung | A63F 13/35 463/31 |
| 2012/0324211 A1* | 12/2012 | Chen | G07F 17/323 713/1 |
| 2012/0324434 A1* | 12/2012 | Tewari | G06F 8/60 707/723 |
| 2013/0031542 A1* | 1/2013 | Arcilla | G06F 9/44505 709/201 |
| 2013/0036429 A1* | 2/2013 | Lee | G06Q 10/00 719/318 |
| 2013/0067180 A1* | 3/2013 | Leet | G06F 16/113 711/161 |
| 2013/0067587 A1* | 3/2013 | Leet | G06F 21/00 707/E17.007 |
| 2013/0085893 A1* | 4/2013 | Bhardwaj | G06Q 30/0631 705/26.62 |
| 2013/0111460 A1* | 5/2013 | Mohamed | G06F 8/61 717/172 |
| 2013/0191495 A1* | 7/2013 | Almstrand | G06F 8/64 709/217 |
| 2013/0191810 A1* | 7/2013 | Brandstetter | G06F 3/04847 717/109 |
| 2013/0232229 A1* | 9/2013 | Firman | G06F 8/61 709/219 |
| 2013/0263260 A1* | 10/2013 | Mahaffey | G06F 21/50 726/22 |
| 2014/0007057 A1* | 1/2014 | Gill | G06F 8/61 717/126 |
| 2014/0022385 A1* | 1/2014 | Fischer | H04M 1/72421 348/143 |
| 2014/0058812 A1* | 2/2014 | Bender | G06Q 30/0267 705/14.12 |
| 2014/0109078 A1* | 4/2014 | Lang | G06F 8/52 717/172 |
| 2014/0201209 A1 | 7/2014 | Hashimoto | |
| 2014/0298318 A1* | 10/2014 | Ahn | G06F 8/60 717/174 |
| 2014/0325502 A1* | 10/2014 | Zarifis | G06F 8/61 717/177 |
| 2014/0357357 A1* | 12/2014 | Boyd | G06F 8/61 463/31 |
| 2014/0379405 A1* | 12/2014 | Herger | H04L 41/5006 705/7.19 |
| 2015/0095145 A1* | 4/2015 | Shulman | G06F 16/9535 705/14.62 |
| 2015/0324353 A1* | 11/2015 | Wu | G06F 40/58 704/9 |
| 2015/0356018 A1 | 12/2015 | Hashimoto | |
| 2016/0309003 A1* | 10/2016 | Boyd | A63F 13/77 |

OTHER PUBLICATIONS

International Preliminary Report on Patentability and Written Opinion for corresponding PCT Application No. PCT/JP2018/027685, 15 pages, dated Feb. 28, 2019.

* cited by examiner

FIG. 6

| GROUP | #1 | #2 | #3 | #4 | #5 | ... |
|---|---|---|---|---|---|---|
| FILE | A,B,C,D,E,F | G,H | G,I,J | G,K,L | K,M,N | ... |
| | 72a | 72b | 72c | 72d | 72e | |

INFORMATION PROCESSING APPARATUS AND DOWNLOAD PROCESSING METHOD

TECHNICAL FIELD

The present invention relates to a technology executed in an information processing apparatus such as a gaming apparatus.

BACKGROUND ART

Game software has been distributed and sold in the form of read-only memory (ROM) media such as an optical disc, a magneto-optical disc, or a Blu-ray disc. Recently, however, due to an increased data communication speed, it is also common that a server delivers an image file of game software through the Internet.

The game software includes a launch file, resource files for executing a game such as a game program, and files used by the operating system (OS) of a gaming apparatus. In recent years, the number of files included in the game software tends to increase and thus result in a great increase in data size.

A group structure disclosed in Patent Document 1 is such that game software is divided into a plurality of groups, and that one of the groups (a first group) is configured to include program files and data files necessary for launching the game software. According to a technology disclosed in Patent Document 1, after all files in the first group are downloaded, the game software can be launched without having to download files in a second group and subsequent groups. Further, files in the second and subsequent groups are downloaded in the background while a user is playing a game. This reduces user download wait time required for starting the game.

CITATION LIST

Patent Literature

[PTL 1] U.S. Patent Application Publication No. 2014/201209

SUMMARY

Technical Problem

One of the reasons why the data size of game software is greatly increased is that voice data and image data are created in such a manner as to support a plurality of languages. These data are hereinafter, referred to as "language-dependent" files (or language resource files). The data size of the language-dependent files accounts for a significant percentage of the data size of the whole software. Therefore, when a data region in a storage apparatus is acquired as needed for the data size of the language-dependent files for all languages, it signifies that a significantly large data region is consumed.

In view of the above circumstances, an object of the present invention is to provide a technology for efficiently downloading language-dependent files.

Solution to Problem

In order to solve the above problem, according to one aspect of the present invention, there is provided an information processing apparatus including a language information retention section and a download processing section. The language information retention section retains working language information that specifies a user-selected working language in the information processing apparatus. The download processing section downloads application software into a storage apparatus. The download processing section acquires, before starting the download of application software, a data region in the storage apparatus as needed for an application body and language-dependent files for a working language specified by the working language information retained by the language information retention section. In a case where the working language to be used by an application is changed, the download processing section confirms whether or not a data region for language-dependent files for the changed working language can be acquired in the storage apparatus.

According to another aspect of the present invention, there is provided a download processing method for use in an information processing apparatus. The download processing method includes the steps of: retaining working language information that specifies a user-selected working language in the information processing apparatus; acquiring, before starting the download of application software, a data region in a storage apparatus as needed for an application body and language-dependent files for a working language specified by the working language information; downloading the application body and the language-dependent files and storing the downloads in the acquired data region in the storage apparatus; and in a case where the working language to be used by an application is changed, confirming whether or not a data region for language-dependent files for the changed working language can be acquired in the storage apparatus.

Any combinations of the aforementioned elements and any conversions of expressions of the present invention between, for example, methods, apparatuses, systems, recording media, and computer programs are also effective as aspects of the present invention.

BRIEF DESCRIPTION OF DRAWINGS

FIG. 6 is a diagram illustrating an example of a group file.

DESCRIPTION OF EMBODIMENT

Figure 1:
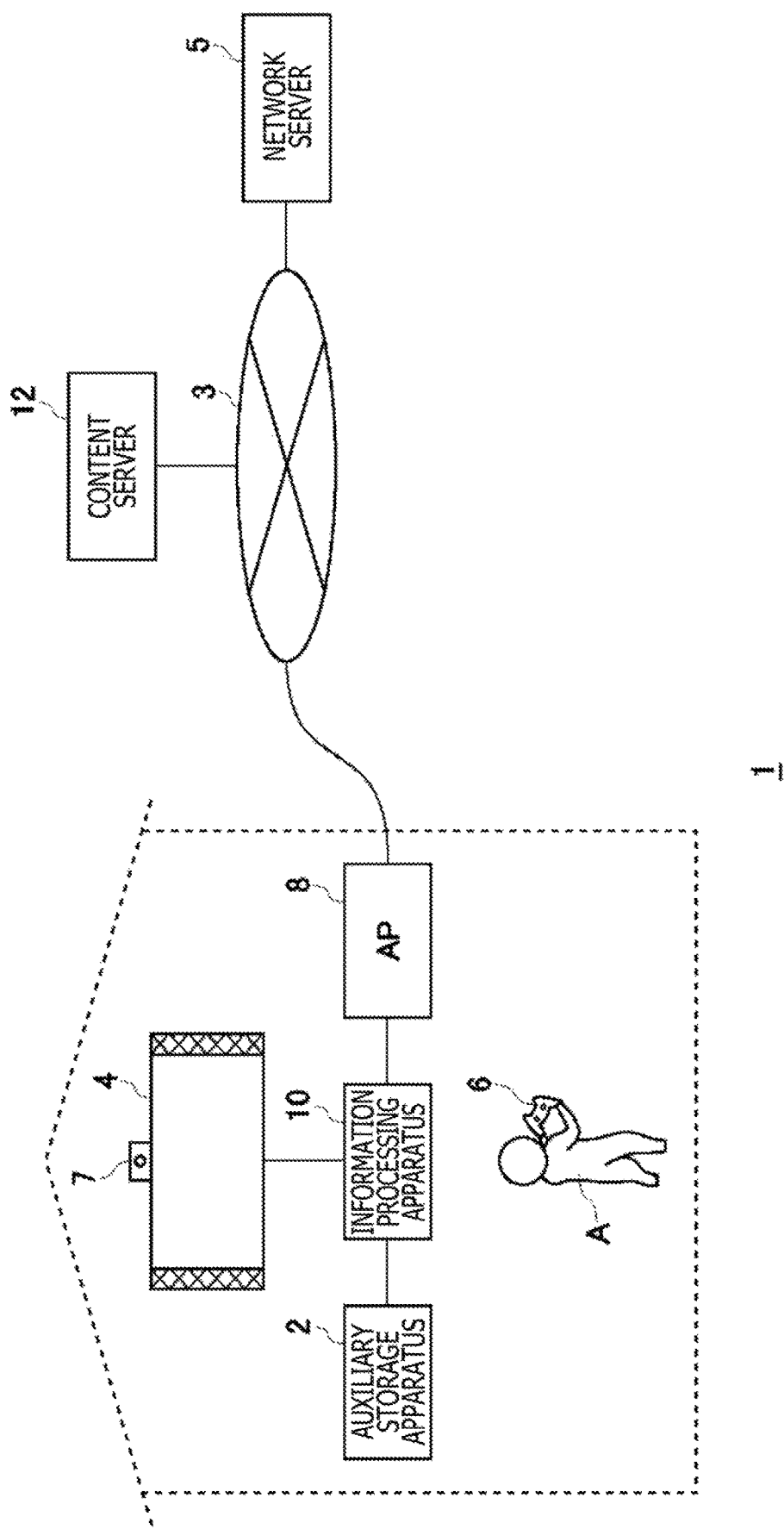
FIG. 1 is a diagram illustrating an information processing system according to an embodiment of the present invention.

FIG. 1 illustrates an information processing system 1 according to an embodiment of the present invention. The information processing system 1 includes an information processing apparatus 10, a network server 5 and a content server 12. The content server 12 delivers digital content. These are connected through a network 3 such as the Internet or a local area network (LAN). The content server 12 retains digital content, for example, of game software, and transmits the digital content in accordance with a request from the information processing apparatus 10.

An access point (hereinafter, referred to as the "AP") 8 functions as a wireless access point and as a router. The information processing apparatus 10 is connected wiredly or wirelessly to the AP 8 and communicatively connected to the network server 5 and content server 12 in the network 3.

The information processing apparatus 10 is wiredly or wirelessly connected to an input apparatus 6 operated by a user. The input apparatus 6 outputs operation information to the information processing apparatus 10. The operation information indicates the result of a user operation. Upon receiving the operation information from the input apparatus 6, the information processing apparatus 10 reflects the received operation information in processing of OS (system software) and game software, and causes an output apparatus 4 to output the processing result. In the information processing system 1, the information processing apparatus 10 is a gaming apparatus, a personal computer, or other terminal apparatus that executes the game software, and the input apparatus 6 may be an apparatus that supplies the operation information, which is indicative of a user operation, to the information processing apparatus 10 such as a game controller. Upon logging into the OS of the information processing apparatus 10, the user is able to operate the OS and the game software.

The network server 5, which is maintained and managed by an administrator of the information processing system 1, provides a network service to the user of the information processing system 1. The network server 5 manages network accounts for user identification. The user uses a network account to sign into the network service provided by the network server 5. After signing into the network service from the information processing apparatus 10, the user is able to receive digital content delivered from the content server 12. The content server 12 may have a user management function of the network server 5. In the embodiment, the digital content may be various types of application software. However, the following description particularly deals with a case where the digital content is game software.

An auxiliary storage apparatus 2 is a large-capacity storage apparatus such as a hard disk drive (HDD) or a flash memory. The auxiliary storage apparatus 2 may be an external storage apparatus connected to the information processing apparatus 10, for example, through a universal serial bus (USB), or may be a built-in storage apparatus. In the embodiment, the auxiliary storage apparatus 2 is a storage apparatus that stores game software downloaded from the content server 12. The output apparatus 4 may be a TV set including an image output display and a voice output speaker, or may be a computer display. The output apparatus 4 may be connected with a wired cable to the information processing apparatus 10, or may be wirelessly connected to the information processing apparatus 10.

The input apparatus 6 includes a plurality of input sections such as a plurality of push-type operating buttons, an analog stick capable of inputting an analog amount, and a rotary button. A camera 7, which is an imaging apparatus, is disposed in the vicinity of the output apparatus 4 and used to capture an image of a space around the output apparatus 4. The information processing apparatus 10 is able to recognize the face of a user from the image captured by the camera 7 and allow the user to log in.

Figure 2:
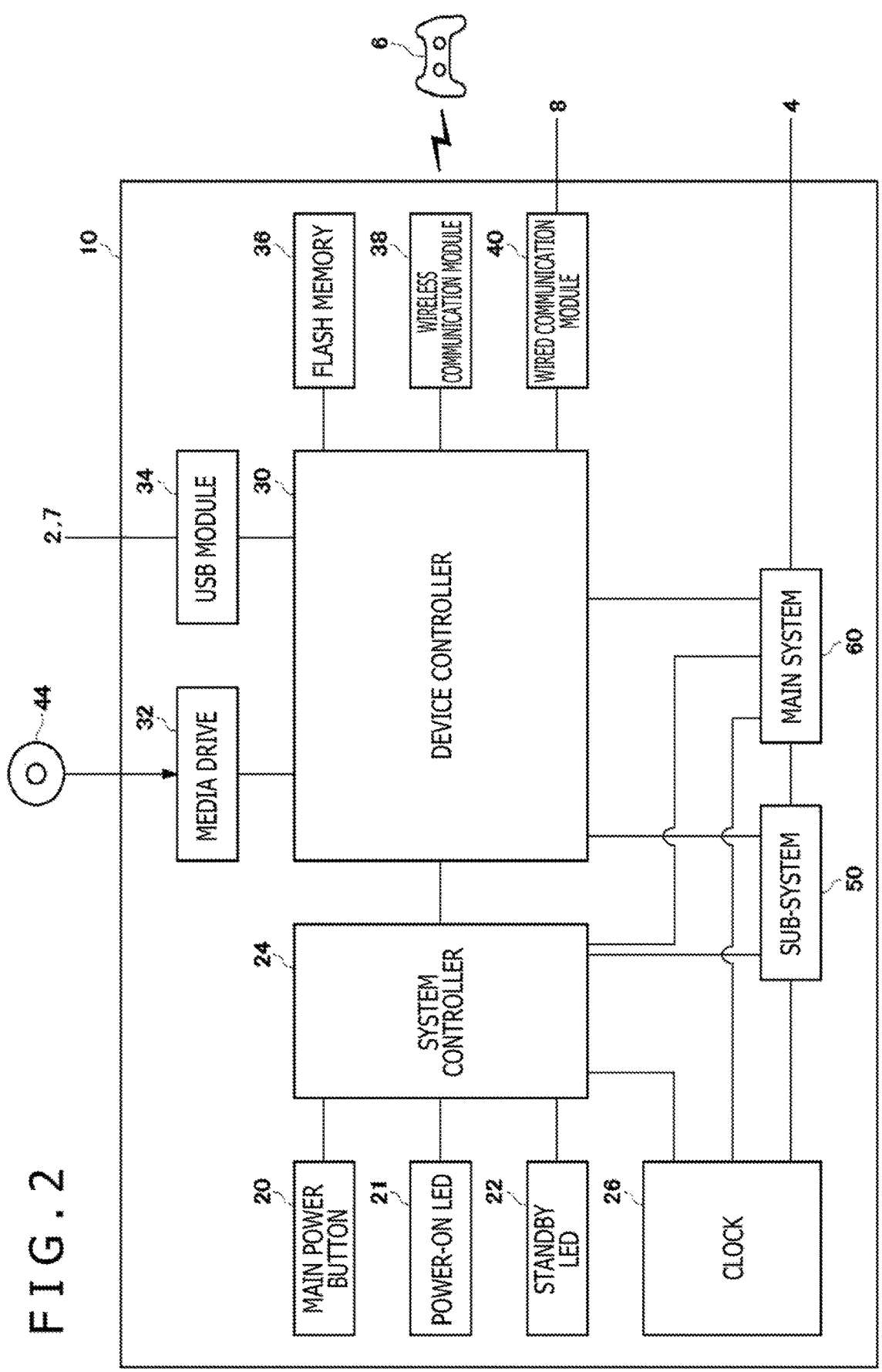
FIG. 2 is a diagram illustrating functional blocks of an information processing apparatus.

FIG. 2 is a diagram illustrating functional blocks of the information processing apparatus 10. The information processing apparatus 10 includes a main power button 20, a power-ON light-emitting diode (LED) 21, a standby LED 22, a system controller 24, a clock 26, a device controller 30, a media drive 32, a USB module 34, a flash memory 36, a wireless communication module 38, a wired communication module 40, a sub-system 50, and a main system 60.

The main system 60 includes, for example, a main central processing unit (CPU), a memory acting as a main storage apparatus and its memory controller, and a graphics processing unit (GPU). The GPU is mainly used to perform arithmetic processing on a game program. These functions may be configured as a system-on-chip and formed on a single chip. The main CPU is capable of executing the game software recorded in the auxiliary storage apparatus 2 or in a ROM medium 44.

The sub-system 50 includes, for example, a sub-CPU and a memory acting as a main storage apparatus and its memory controller. However, the sub-system 50 does not include a GPU and is incapable of executing a game program. The sub-CPU has a smaller number of circuit gates than the main CPU, and consumes a smaller amount of operating power than the main CPU. The sub-CPU operates even when the main CPU is in the standby state. Processing functions of the sub-CPU are limited to reduce its power consumption.

The main power button 20 is used to receive an operation input from the user, mounted on the front of the housing of the information processing apparatus 10, and operated to turn on or off the power supply to the main system 60 of the information processing apparatus 10. The power-ON LED 21 illuminates when the main power button 20 is turned on. The standby LED 22 illuminates when the main power button 20 is turned off.

The system controller 24 detects when the main power button 20 is pressed by the user. The clock 26 is a real-time clock that generates current date/time information and supplies it to the system controller 24, the sub-system 50, and the main system 60.

The device controller 30 is configured as an large-scale integrated circuit (LSI) that acts like a southbridge to execute the transfer of information between devices. As depicted in FIG. 2, the device controller 30 is connected to devices such as the system controller 24, the media drive 32, the USB module 34, the flash memory 36, the wireless communication module 38, the wired communication module 40, the sub-system 50, and the main system 60. The device controller 30 absorbs the differences in electrical characteristics and data transfer speeds of individual devices, and controls the timing of data transfer.

The media drive 32 is a drive apparatus that accepts and drives a ROM medium 44 on which a game or other application software is recorded, and reads programs and data from the ROM medium 44. The ROM medium 44 is a read-only recording medium such as an optical disc, a magneto-optical disc, or a Blu-ray disc.

The USB module 34 is connected with a USB cable to external equipment. The USB module 34 may be connected with a USB cable to the auxiliary storage apparatus 2 and the camera 7. The flash memory 36 is an auxiliary storage apparatus forming an internal storage. The wireless communication module 38 wirelessly communicates, for example, with the input apparatus 6 in accordance with a communication protocol such as the Bluetooth (registered trademark) protocol or the IEEE 802.11 protocol. The wired communication module 40 wiredly communicates with the external equipment, and is connected to the network 3 through the AP 8.

Returning to FIG. 1, the content server 12 supplies the game software to the information processing apparatus 10.

The game software includes a launch file, resource files for executing a game such as a game program, and files used by the OS of the information processing apparatus 10. The content server 12 supplies, to the information processing apparatus 10, image files for the game software originally recorded in the ROM medium 44. The game program is a program necessary for executing the game. When the game program runs, the game progresses. The launch file acts as a program for launching the game program. When the launch file is executed, the game program is recalled and executed. The files used by the OS include, for example, game icon images to be displayed on a menu screen of the information processing apparatus 10.

The game software has a tree directory structure. The launch file is included in a root directory in the top layer of the tree directory structure. Subdirectories in lower layers are classified according to the file type. For example, a 3D model subdirectory, a texture subdirectory, and a script subdirectory are formed. The subdirectories each contain associated files. The 3D model subdirectory contains a plurality of 3D model files. The texture subdirectory contains a plurality of texture files. The script subdirectory contains a plurality of script files. The texture subdirectory contains, for example, a texture file for a scene 1 of the game, a texture file for a scene 2, and a texture file for a scene 3.

Recently, games are often prepared in such a manner as to support a plurality of languages. Therefore, voice data and image data are created for each of the plurality of languages so that voice files and image files for the plurality of languages are contained in a single software package. The voice files and image files created for each language are hereinafter referred to as the "language-dependent files."

It is known that these language-dependent files include voice files having a significantly large data size due to lengthened game scenarios. Therefore, the game software in the embodiment is formed to include resource files, which each contain a language-specific collection of voice files and image files, in order to permit the user to install necessary language-dependent files only. In this sense, the language-dependent files may be referred to as the language resource files.

Figure 3:
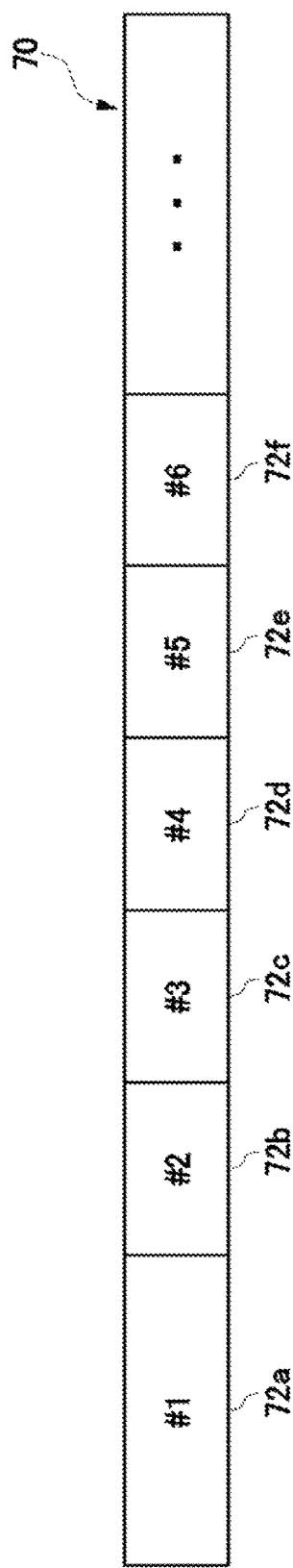
FIG. 3 is a conceptual diagram illustrating a file organization of game software.

FIG. 3 is a conceptual diagram illustrating a file organization of game software. The game software 70 in the embodiment includes a plurality of files. As depicted in FIG. 3, the game software 70 is logically divided into a plurality of groups 72. Each of the files belongs to at least one group among the plurality of groups 72. At least one file belongs to each of the groups 72. The groups existing in the game software 70 depicted in FIG. 3 include a first group 72a as the leading group, and also include a second group 72b, a third group 72c, a fourth group 72d, a fifth group 72e, and a sixth group 72f as the subsequent groups. A seventh and subsequent groups 72 may exist so as to follow the sixth group 72f. Each group is identified by a group number such as the first or the second.

Files included in a plurality of subdirectories belong to each of logically divided groups. That is, each group includes different types of files, and setup is performed so that files belonging to each group are necessary for the information processing apparatus 10 to execute a specific unit such as a scene or a stage within a game.

Program files and data files necessary for launching the game software 70 belong to the first group 72a. Therefore, when the information processing apparatus 10 downloads all the files belonging to the first group 72a in a case where the game software 70 is to be acquired from the content server 12, the information processing apparatus 10 is able to immediately launch the game software 70 without having to download the files in the second group 72b and subsequent groups. After acquiring all the files belonging to the first group 72a and launching the game software 70, the information processing apparatus 10 downloads the files belonging to the subsequent groups 72 in the background. As described above, the minimum number of files required for game execution are first downloaded, and the game is made executable when all such files are ready for use. This makes it possible to reduce user download wait time.

Figure 4:
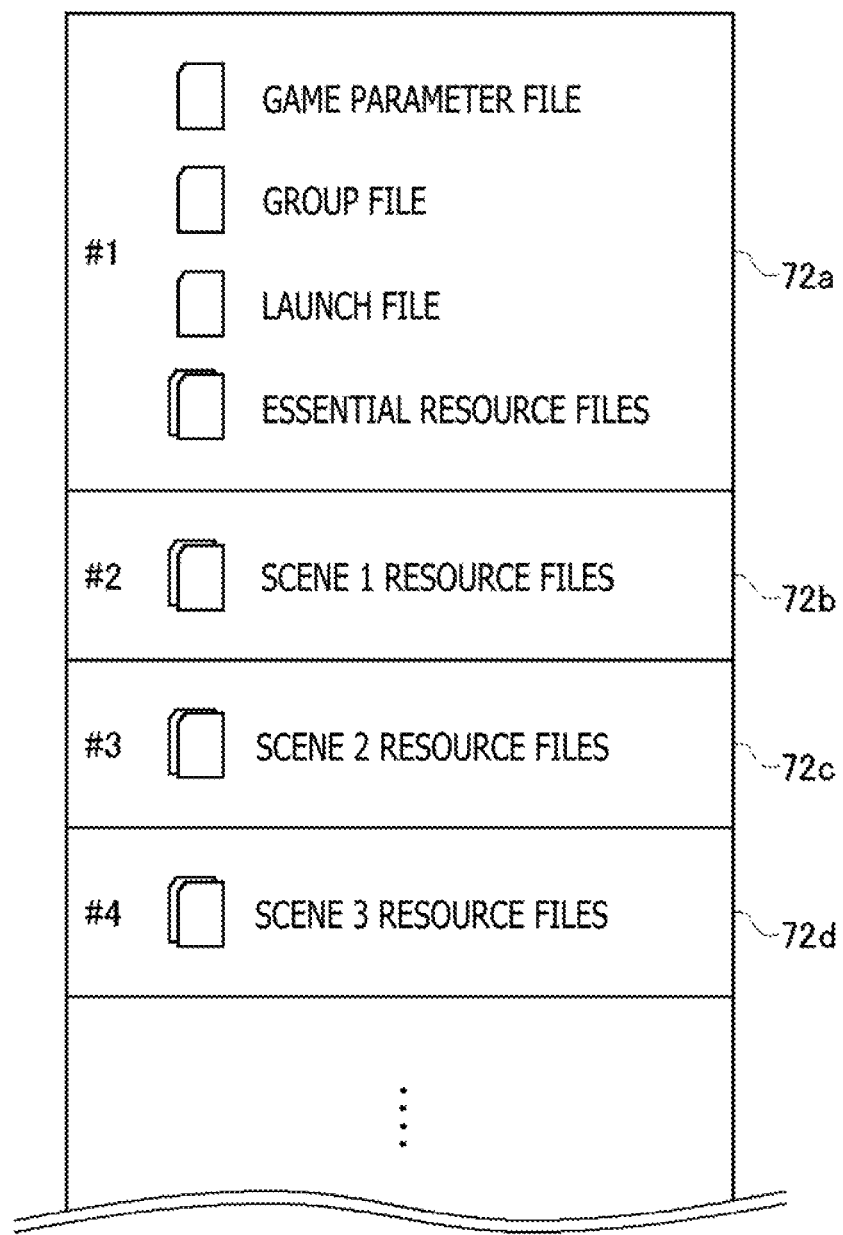
FIG. 4 is a diagram illustrating an example of a detailed file organization of the game software.

FIG. 4 is a diagram illustrating an example of a detailed file organization of the game software. The first group 72a includes files of the game software 70 that are to be downloaded first. In FIG. 4, a game parameter file, a group file, a launch file, and essential resource files are depicted as the files to be downloaded first.

The game parameter file, which is a file used by the OS of the information processing apparatus 10, contains, for example, icon image data and information about a title identification (ID) and a display resolution.

The group file is a definition file that describes groups to which individual files belong. The group file may be expressed, for example, in extensible markup language (XML), but may be expressed in a program language other than XML. The group file may be in any format. The group file will be described later with reference to FIGS. 5 and 6.

The launch file is a program for launching the game program. The essential resource files include, for example, programs and other resource files essential to game execution, and common files used in the entire game.

When the information processing apparatus 10 acquires and installs the files belonging to the first group 72a in a case where the game software 70 is to be downloaded, for example, from the content server 12, the information processing apparatus 10 is able to launch the game. Conversely, the first group 72a is configured to include files that are necessary for the user to play a part of the game. Here, a game play may include a setup action that is performed by the user in order, for example, to determine a character and a game level. That is, the first group 72a is configured to include files that are necessary for launching the game and creating a state where the user is allowed to perform at least a certain action. The game play executable by using the files included in the first group 72a may be, for example, an initial setup of the game or the game play executable up to its first stage. This may vary from one game developer to another.

In the example of FIG. 4, a plurality of scene 1 resource files belong to the second group 72b, a plurality of scene 2 resource files belong to the third group 72c, and a plurality of scene 3 resource files belong to the fourth group 72d. Specifically, the plurality of resource files include, for example, programs, 3D model files for specific scenes, texture files, and script files, and additionally include files contained in a plurality of subdirectories having a directory structure.

Figure 5:
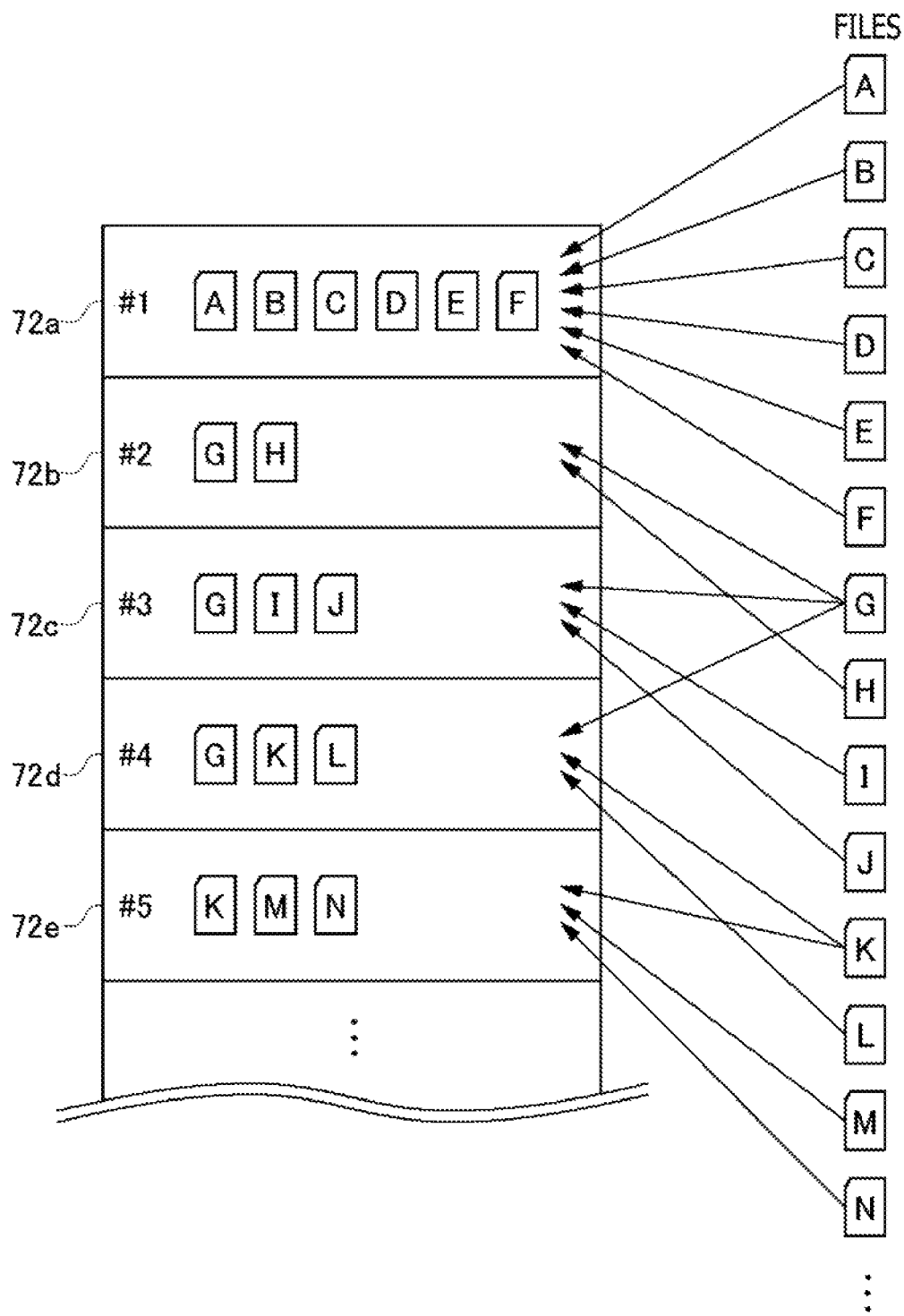
FIG. 5 is a diagram illustrating an exemplary relationship between groups and files.

FIG. 5 illustrates an exemplary relationship between groups and files. FIG. 5 indicates that files A to N belong to various groups 72. As depicted in FIG. 5, each file belongs to at least one of a plurality of groups 72, and at least one file belongs to each group 72. A file G belongs to the second group 72b, the third group 72c, and the fourth group 72d. This signifies that the file G is necessary for configuring the scenes 1, 2, and 3 in the game. In this manner, one file may belong to a plurality of groups. Similarly, a file K belongs to a plurality of groups 72, in other words, the fourth group 72d and the fifth group 72e.

FIG. 6 illustrates an example of the group file. As mentioned earlier, the group file may be expressed in XML, and may be expressed in a program language other than XML. For ease of understanding, FIG. 6 depicts the group file to indicate the correspondence between groups and files in tabular form. When downloading the individual files of the game software 70, the information processing apparatus 10 is able to reference the group file and determine whether or not all files belonging to a certain group are ready. As regards, for example, the first group 72a, the information processing apparatus 10 is able to reference the group file and recognize that files A, B, C, D, E, and F belong to the first group 72a. Therefore, when these files are stored in the auxiliary storage apparatus 2, the information processing apparatus 10 determines that all the files belonging to the first group 72a are ready. The group file may relate to any one of the files A to F.

As described above, the game software 70 includes a plurality of groups. Therefore, the information processing apparatus 10 is able to download the files in a download sequence that specifies the download priorities of the groups. If the user wants to enjoy a single play in a case where the game software 70 includes single-play resource files for playing by one person and multi-play resource files for playing by a plurality of persons, the information processing apparatus 10 first downloads the first group 72a, then preferentially downloads a single-play group, and eventually downloads a multi-play group in the background while the user is enjoying the single play. Meanwhile, if the user wants to enjoy a multi-play, the information processing apparatus 10 first downloads the first group 72a, then preferentially downloads the multi-play group, and eventually downloads the single-play group in the background while the user is enjoying the multi-play.

By default, the download sequence is set such that the first group 72a is to be downloaded first. Groups to be subsequently downloaded may be specified depending on the game. If the user selects a single play as mentioned above, the game specifies the download sequence of single-play groups in accordance with the sequence of game progression. This ensures that the game software 70 is efficiently downloaded.

Information about a language to be used by the user is set in the information processing apparatus 10. If, for example, the user is a Japanese, the language is set to Japanese. If the user is an American, the language is set to English. The OS of the information processing apparatus 10 retains user-selected working language information so that a home screen and other screens presented by the OS are generated on the basis of the working language information.

When performing a process of downloading the game software from the content server 12, the information processing apparatus 10 according to the embodiment downloads only language-dependent files (language resource files) matching the working language information that is set. Therefore, if English is set as the working language, the information processing apparatus 10 downloads English resource files, but does not download the resource files for the other languages.

Figure 7:
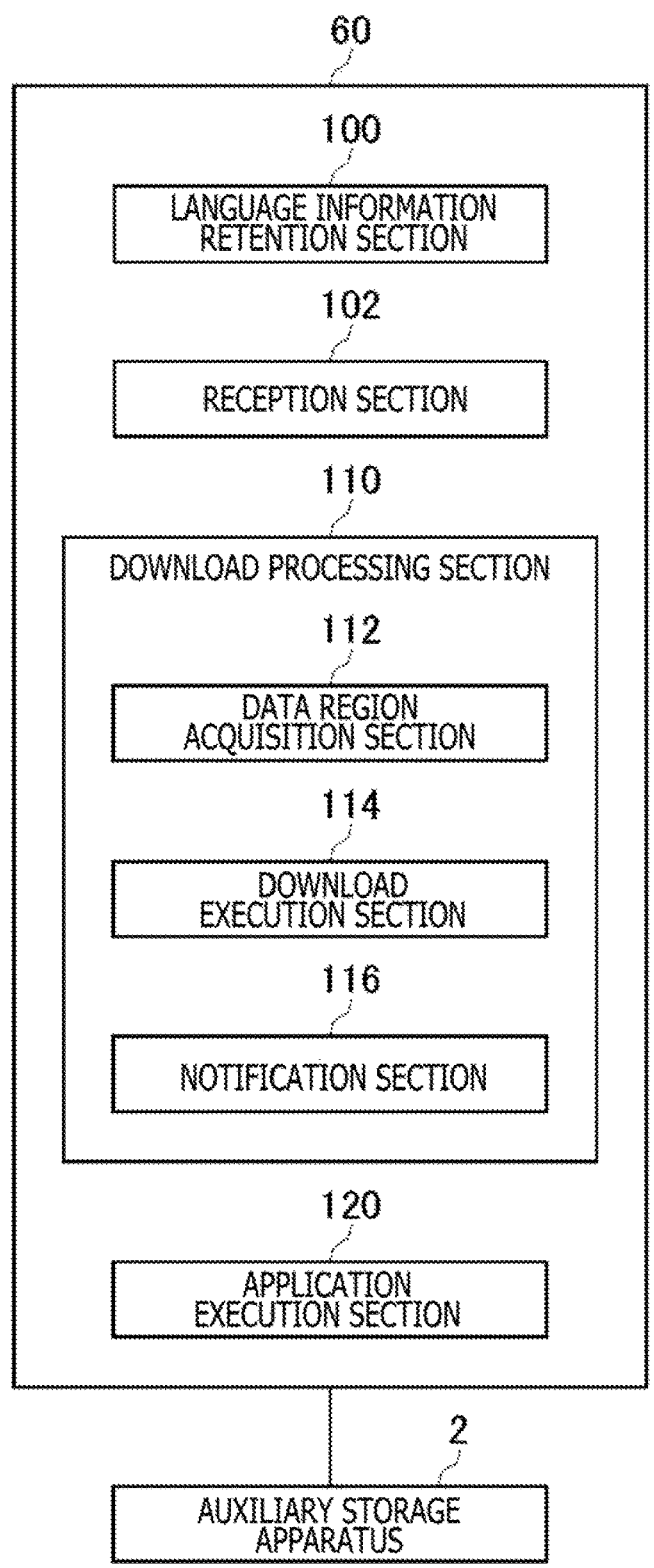
FIG. 7 is a diagram illustrating functional blocks for executing a download process.

FIG. 7 illustrates functional blocks for executing a download process in the information processing apparatus 10. The main system 60 includes a language information retention section 100, a reception section 102, a download processing section 110, and an application execution section 120. The download processing section 110 includes a data region acquisition section 112, a download execution section 114, and a notification section 116, and performs a process of downloading the game software into the auxiliary storage apparatus 2. The application execution section 120 executes the downloaded game software.

The above-mentioned elements may be implemented by hardware components, such as a CPU, a memory, a program loaded into a memory, and a storage of an arbitrary computer. However, FIG. 7 depicts functional blocks that are implemented by allowing such elements to coordinate with each other. Therefore, it will be understood by those skilled in the art that the functional blocks may be variously implemented by hardware only, by software only, or by a combination of hardware and software.

The language information retention section 100 retains the working language information that is selected by the user to specify the working language in the information processing apparatus 10. The working language is selected by the user during initial setup of the information processing apparatus 10. However, the user is allowed to freely change the initially-set working language. The user-selected working language is referred to also as the "system language." The system language is used to configure a system screen that is presented by the OS of the information processing apparatus 10. If, for example, the system language is English, the OS generates the system screen in English.

During the process of downloading the game software 70, the auxiliary storage apparatus 2 is used as a storage apparatus for storing a plurality of files included in the game software 70. In the game software 70, each file belongs to at least one group, and at least one file belongs to each group. However, the download process is executed on an individual group basis. If, for example, a download request for a group S is generated in a case where files X, Y, and Z belong to the group S, the files X, Y, and Z are downloaded from the content server 12 so that all the files X, Y, Z belonging to the group S are stored in the auxiliary storage apparatus 2. If the file X is already downloaded, the files Y and Z are downloaded from the content server 12 so that all the files X, Y, Z belonging to the group S are stored in the auxiliary storage apparatus 2.

A detailed download procedure in the information processing apparatus 10 will now be described. When the user purchases game software, the reception section 102 receives the address of a game software sales page, and causes the output apparatus 4 to display the software sales page. When the user operates the input apparatus 6 to select desired game software, the download processing section 110 performs a process of downloading the selected game software into the auxiliary storage apparatus 2.

More specifically, before the start of a game software download, the data region acquisition section 112, which is in the download processing section 110, inquires of the content server 12 about the data size of a game body and language-dependent files for the working language specified by the working language information retained by the language information retention section 100. The game body includes files of the download target game software except for all language resource files. Therefore, the data size of the game body is equal to a value that is obtained by subtracting the data size of all the language resource files from the overall data size of the game software. In the embodiment, it is assumed that English is set as the working language. Therefore, the data region acquisition section 112 inquires of the content server 12 about the data size of the game body and the data size of language-dependent files for English (English resource files). The content server 12 responds to the information processing apparatus 10 about the data size of each of the game body and the English resource files or the sum of the data sizes.

Upon receiving the response from the content server 12, the data region acquisition section 112 confirms whether or not a data region for the game body and the English resource files can be acquired in the auxiliary storage apparatus 2. In this instance, the data region acquisition section 112 regards a predetermined size of a continuous region as a minimum unit, and confirms whether or not the data region for the game body and the English resource files can be acquired. If the data region can be acquired, the data region acquisition section 112 acquires the data region for the game software. Acquiring the data region signifies that the data region is not to be used for other purposes. The minimum unit of the continuous region may be, for example, 128 Mbytes.

In the embodiment, as regards the language resource files, the data region acquisition section 112 acquires only a data region for resource files for the working language retained by the language information retention section 100, but does not acquire a data region for resource files for the other languages. In general, the user rarely changes the working language. Thus, if a data region for resource files for the other languages is acquired in the auxiliary storage apparatus 2, the data region may turn out to be a waste. In the embodiment, therefore, as regards the language resource files, the data region acquisition section 112 makes an effective use of the data region of the auxiliary storage apparatus 2 by acquiring only a data region for resource files for the working language. After the data region acquisition section 112 acquires the data region for the game body and English resource files in the auxiliary storage apparatus 2, the download execution section 114 downloads and stores the game body and the English resource files in the acquired data region of the auxiliary storage apparatus 2.

According to the download process in the embodiment, when the download execution section 114 downloads all the files belonging to the first group 72*a*, the application execution section 120 is able to immediately launch the game software without waiting until the download execution section 114 downloads the files belonging to the second group 72*b* and subsequent groups. The download execution section 114 continues in the background to download the files belonging to the subsequent groups.

As described above, when the user purchases the game software, the download processing section 110 downloads the game body and working language resource files to permit the user to play the game.

Subsequently, the language used by an application may be changed. A first case of a working language change is encountered when the working language information retained by the language information retention section 100 is changed, that is, when the user changes the system language. A second case of a working language change is encountered when the user changes the working language within the game.

When the language used in the application is changed, the data region acquisition section 112 inquires of the content server 12 about the data size of resource files (language-dependent files) for the changed working language, and confirms whether or not the data region of the resource files for the changed working language can be acquired in the auxiliary storage apparatus 2. In this instance, the data region acquisition section 112 regards a 128-Mbyte continuous region as a minimum unit, and confirms whether or not the data region can be acquired in the auxiliary storage apparatus 2. If the data region acquisition section 112 confirms that the data region cannot be acquired, the notification section 116 causes the output apparatus 4 to display a notification about a download error.

In the above-mentioned first case, that is, when the application execution section 120 launches the game software after the system language is changed by the user, the data region acquisition section 112 confirms that the working language information retained by the language information retention section 100 is changed, and then confirms whether or not the data region for resource files for the changed working language can be acquired in the auxiliary storage apparatus 2. If, for example, the user changes the system language from English to Japanese, the data region acquisition section 112 confirms whether or not the data region for Japanese resource files can be acquired in the auxiliary storage apparatus 2.

Without regard to the result of the above confirmation, the application execution section 120 may launch the game software to create a state where the user is allowed to use the game, that is, play the game. Even in a case where the data region acquisition section 112 confirms that the data region for the Japanese resource files cannot be acquired, English resource files used before the change are installed. Therefore, the application execution section 120 may execute the game body by using the English resource files.

Figure 8:
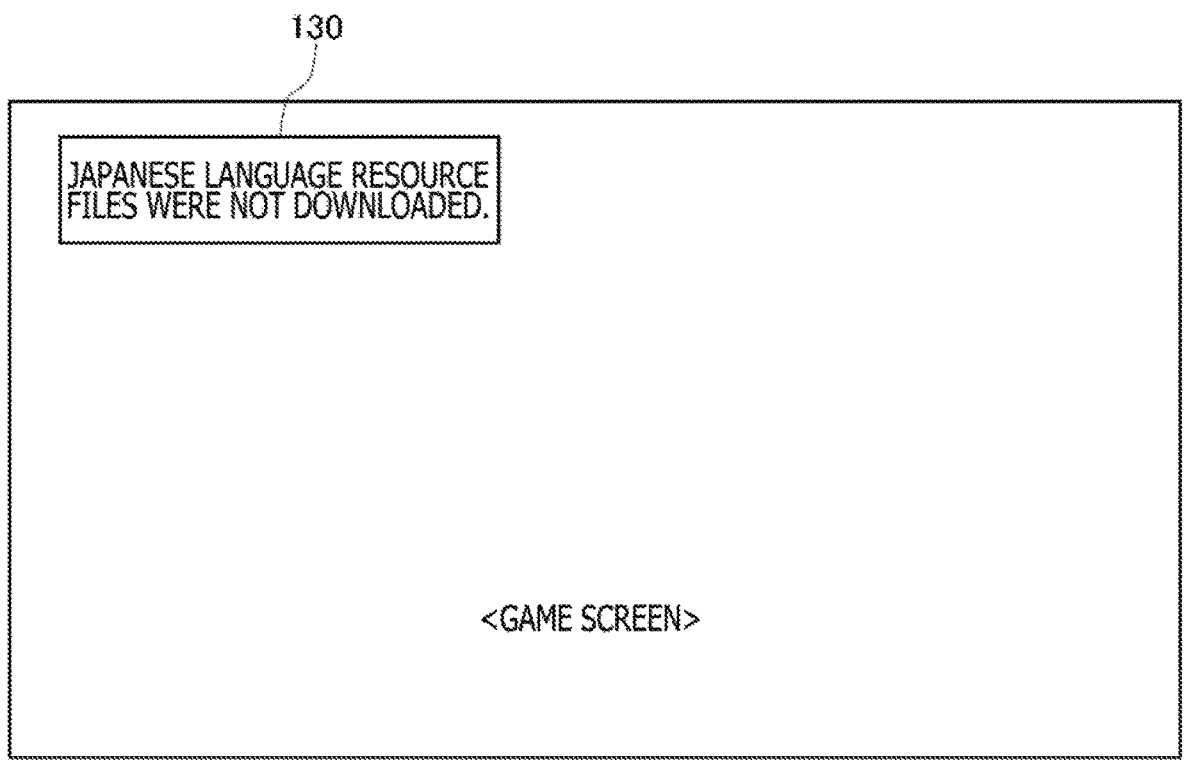
FIG. 8 is a diagram illustrating an example of notification information.

FIG. 8 illustrates notification information 130 displayed by the notification section 116. In a case where the data region acquisition section 112 is unable to acquire the data region for the Japanese resource files in the auxiliary storage apparatus 2, the notification section 116 displays the notification information 130 about a download error. The user views the notification information 130 displayed on a game screen, and recognizes that, for example, in-game voices remain in English and do not switch to Japanese.

It is to be understood by those skilled in the art that the foregoing embodiment is illustrative, and that combinations of the elements and processes described in conjunction with the embodiment may be variously modified, and further that such modifications may be made without departing from the spirit and scope of the present invention. The foregoing embodiment assumes that a game is an example of the application. However, the present invention is also applicable to an application other than a game.

REFERENCE SIGNS LIST

1 . . . Information processing system, 2 . . . Auxiliary storage apparatus, 10 . . . Information processing apparatus, 12 . . . Content server, 100 . . . Language information retention section, 102 . . . Reception section, 110 . . . Download processing section, 112 . . . Data region acquisition section, 114 . . . Download execution section, 116 . . . Notification section, 120 . . . Application execution section

INDUSTRIAL APPLICABILITY

The present invention is applicable to an information processing apparatus such as a gaming apparatus.

The invention claimed is:
1. An information processing apparatus comprising:
a language information retention section that retains working language information for specifying a user-selected working language in the information processing apparatus; and
a download processing section that downloads game software into a storage apparatus, wherein the game software files are divided into a plurality of downloadable groups such that the first group contains files necessary to launch and play part of the game, and one or more subsequent groups contain different scenery or stage files for the game, wherein the subsequent groups are downloadable in different orders depending on a user's game preferences and are downloaded in the background while the game is executing, wherein the download processing section acquires, before starting the download of game software, a data region in the storage apparatus as needed for the game and language-dependent files for the specified working language; and wherein, in a case where the working language to be used by the game is changed, the download processing section confirms whether or not a data region for language-dependent files for the changed working language is acquirable in the storage apparatus.

2. The information processing apparatus according to claim 1, wherein, in a case where the data region for the language-dependent files for the changed working language is not acquirable in the storage apparatus, the download processing section displays a notification about a download error.

3. The information processing apparatus according to claim 1, wherein the download processing section regards a predetermined size of a continuous region as a minimum unit, and confirms whether or not the data region for the language-dependent files for the changed working language is acquirable in the storage apparatus.

4. The information processing apparatus according to claim 1, further comprising:

an application execution section that executes the game software, wherein, when the application execution section launches the game software after the working language information retained by the language information retention section is changed, the download processing section confirms whether or not the data region for the language-dependent files for the changed working language is acquirable in the storage apparatus.

5. The information processing apparatus according to claim 4, wherein, even in a case where the download processing section confirms that the data region is not acquirable, the application execution section launches the game software to create a state where a user is allowed to use the game.

6. The information processing apparatus according to claim 1, wherein the first group includes a game parameter file, a group file, a launch file, and essential resource files, wherein the group file indicates which files belong to which group so that the information processing apparatus can determine when all files belonging to one of a plurality of different groups have been downloaded and stored.

7. The information processing apparatus according to claim 1, wherein the game software comprises a game body and language-dependent files.

8. The information processing apparatus according to claim 7, wherein before the start of the game software download, a data region acquisition section of the download processing section inquires of a content server about: (1) a data size of the game body, and (2) a data size of the language-dependent files for the working language.

9. The information processing apparatus according to claim 8, wherein a first case of a working language change occurs when the working language information retained by the language information retention section is changed and a second case of a working language change occurs when the user changes the working language within the game.

10. The information processing apparatus according to claim 8, wherein when the language used in the game is changed, the data region acquisition section inquires of the content server about the data size of language-dependent files for the changed working language and confirms whether or not a data region for the changed working language can be acquired in the storage apparatus.

11. A download processing method for use in an information processing apparatus, the download processing method comprising:

retaining working language information for specifying a user-selected working language in the information processing apparatus;

before starting a download of game software, acquiring a data region in a storage apparatus as needed for the game and language-dependent files for a specified working language, wherein the game software files are divided into a plurality of downloadable groups such that the first group contains files necessary to launch and play part of the game, and one or more subsequent groups contain different scenery or stage files for the game, wherein groups the subsequent are downloadable in different orders depending on a user's game preferences and are downloaded in the background while the game is executing, downloading the game and language-dependent files and storing the downloads in the data region acquired in the storage apparatus; and in a case where the working language to be used by the game is changed, confirming whether or not a data region for the language-dependent files for the changed working language is acquirable in the storage apparatus.

12. A non-transitory, computer-readable storage medium containing a program, which when executed by a computer, causes the computer to carry out actions, comprising:

retaining working language information for specifying a user-selected working language in the computer;

before starting a download of game software, acquiring a data region in a storage apparatus as needed for the game and language-dependent files for a specified working language, wherein the game software files are divided into a plurality of downloadable groups such that the first group contains files necessary to launch and play part of the game, and one or more subsequent groups contain different scenery or stage files for the game, wherein groups the subsequent groups are downloadable in different orders depending on a user's game preferences and are downloaded in the background while the game is executing, downloading the game and language-dependent files and storing the downloads in the data region acquired in the storage apparatus; and in a case where the working language to be used by the game is changed, confirming whether or not a data region for the language-dependent files for the changed working language is acquirable in the storage apparatus.

* * * * *